US008662047B2

(12) United States Patent
Ostojic et al.

(10) Patent No.: US 8,662,047 B2

(45) Date of Patent: Mar. 4, 2014

(54) HANDHELD WORK APPARATUS

(75) Inventors: Predag Ostojic, Freiberg (DE); Andreas Lingen, Althütte (DE); Michael Schmid, Korb (DE); Jörg Amann, Walheim (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 1192 days.

(21) Appl. No.: 12/149,622

(22) Filed: May 6, 2008

(65) Prior Publication Data

US 2009/0126672 A1 May 21, 2009

(30) Foreign Application Priority Data

Nov. 17, 2007 (DE) ........................ 10 2007 054 929

(51) Int. Cl.

*F02F 1/22* (2006.01)
*F02F 3/24* (2006.01)
*F16J 9/22* (2006.01)

(52) U.S. Cl.

USPC .................. 123/193.2; 123/193.4; 123/41.78; 123/532; 277/459; 277/477; 277/481; 277/465; 92/165 R; 92/169.1; 92/181 R

(58) Field of Classification Search

USPC ............. 123/73 PP, 65 PP, 65 P, 73 A, 73 FA, 123/193.6, 73 R, 73 C, 65 A, 67, 58.4, 73 CC, 123/74 A, 71 R, 73 V, 73 F, 41.72, 196 R, 123/41.78, 193.2, 532, 193.4; 277/453, 277/457, 310, 434, 447, 458, 459, 477, 481, 277/473, 465

See application file for complete search history.

(56) References Cited

U.S. PATENT DOCUMENTS

| | | | | |
|---|---|---|---|---|
| 1,330,188 | A * | 2/1920 | Johnston | 277/453 |
| 3,774,303 | A * | 11/1973 | Burkett et al. | 30/382 |
| 4,070,998 | A * | 1/1978 | Grow | 123/26 |
| 4,962,691 | A * | 10/1990 | Kanao | 277/445 |
| 5,054,441 | A | 10/1991 | Nakatani et al. | |
| 5,664,536 | A * | 9/1997 | Bigsby | 123/193.4 |
| 6,502,539 | B2 * | 1/2003 | Ribeiro et al. | 123/193.4 |
| 8,051,830 | B2 * | 11/2011 | Taylor | 123/308 |
| 2003/0217711 | A1 * | 11/2003 | Geyer et al. | 123/73 PP |
| 2007/0119396 | A1 * | 5/2007 | Yuasa | 123/73 R |

FOREIGN PATENT DOCUMENTS

| | | | |
|---|---|---|---|
| DE | 32 15 169 | | 10/1983 |
| JP | 60-15060 | A | 1/1985 |
| JP | 62-26346 | A | 2/1987 |
| JP | 2006-291722 | A | 10/2006 |

* cited by examiner

*Primary Examiner* — Lindsay Low
*Assistant Examiner* — Kevin Lathers
(74) *Attorney, Agent, or Firm* — Walter Ottesen P.A.

(57) ABSTRACT

A handheld work apparatus has an internal combustion engine (9, 9', 9") and a starter device (8). The internal combustion engine has a piston (10, 10") which has at least one piston ring (37, 38). In order to avoid a delay when starting the engine, at least one recess is provided in the cylinder bore (26) which bridges the at least one piston ring (37, 38) in at least one position of the piston (10, 10') and which has a distance (n, o, p) to all function openings of the engine (9, 9', 9") configured in the cylinder bore (26). To reduce the compression in the combustion chamber (25), the piston (10') has only one piston ring (37) or two piston rings (37, 38) are provided having respective piston ring gaps (39, 40) defining an angle (β) which is up to approximately 45°.

15 Claims, 5 Drawing Sheets

HANDHELD WORK APPARATUS

CROSS REFERENCE TO RELATED APPLICATION

This application claims priority of German patent application no. 10 2007 054 929.8, filed Nov. 17, 2007, the entire content of which is incorporated herein by reference.

BACKGROUND OF THE INVENTION

Handheld work apparatus driven by an internal combustion engine are generally well known. When starting the internal combustion engine of a handheld work apparatus with a starter device having a spring, the starter spring is first wound and energy is stored in the starter spring. In this way, the piston moves in the direction toward top dead center and builds up the compression in the combustion chamber. An equilibrium arises between the compression pressure in the combustion chamber and the torque on the crankshaft which is generated by the starter spring. The compression pressure in the combustion chamber thereby remains constant. The gas mass in the combustion chamber can slowly reduce because of leakages in the cylinder, for example, at the piston rings. This leads to the situation that the piston is moved slowly further in the direction toward top dead center until there is an equilibrium between the gas pressure in the combustion chamber and the torque generated by the spring at the crankshaft. Because of the lever relationships at the crankshaft, the piston can then overcome the top dead center after reaching a constructively pregiven position in the cylinder and the engine can start.

The delay which occurs because of the slow escape of gas from the combustion chamber is unwanted when starting an internal combustion engine.

From U.S. Pat. No. 5,054,441 and German patent publication 32 15 169, it is known to provide escape grooves or escape channels in the cylinder for engines not having a spring starting device with these grooves or channels connecting the combustion chamber with a transfer channel or with the outlet of the engine. The gas volume in the combustion chamber can reduce rapidly during starting because of these escape grooves. The escape grooves connect directly to a function opening, namely, with a transfer channel or the outlet. For this reason and during normal operation of the engine, uncombusted fuel can escape through the outlet. During operation, the compression is reduced so that the engine power can be reduced because of the connection of an escape groove with a function opening.

SUMMARY OF THE INVENTION

It is an object of the invention to provide a handheld work apparatus of the kind described above wherein a good start is made possible and wherein good exhaust-gas values are obtained during operation.

The handheld work apparatus of the invention includes: an internal combustion engine; a starter device operatively connected to the internal combustion engine; the internal combustion engine including: a cylinder defining a combustion chamber and a cylinder longitudinal axis; a crankcase connected to the cylinder; a crankshaft rotatably journalled in the crankcase; a piston disposed in the cylinder so as to move back and forth therein to drive the crankshaft and to delimit the combustion chamber; at least one transfer channel for connecting the crankcase to the combustion chamber at constructively pregiven positions of the piston; an inlet for receiving combustion air into the crankcase; a device for metering fuel to mix with the combustion air; an outlet for passing exhaust gases from the combustion chamber; the cylinder having an imaginary center plane which partitions the inlet at the middle thereof and contains the cylinder longitudinal axis; the piston having a piston ring arranged therein; the piston ring being configured as an open ring having two mutually adjacent ends conjointly defining a piston ring gap; the cylinder having a cylinder bore for accommodating the piston; the cylinder bore having a plurality of function openings formed therein; the cylinder bore further having a recess formed therein which bridges the piston ring in at least one position of the piston; and, the recess being at a predetermined spacing to all of the function openings.

It has been shown that bridging of the piston rings is sufficient to obtain a good starting operation. The gas volume in the combustion chamber can escape, in part, to the crankcase via the bridging of the piston rings and the piston skirt. An escape of fuel directly into the outlet is thereby avoided. At least one recess is spaced to all function openings of the internal combustion engine, that is, to the outlet, inlet and transfer windows so that there is no direct connection between this recess and the function openings. In this way, the start operation can be facilitated and a simple, delay-free starting can be obtained without spring start devices having a wind-up function having to be utilized wherein the spring must be wound up over several strokes of the pull rope.

Advantageously, at least one recess is arranged above the inlet. The arrangement above the inlet causes a large distance to the outlet so that a passage of uncombusted fuel is avoided from the recess along the piston skirt to the outlet because of the long path between the recess and the outlet and the comparatively large flow resistance resulting therefrom. Advantageously, at least one recess is arranged above a transfer channel. It has been shown that a good reduction of the compression in the combustion chamber can take place with the arrangement of a recess above a transfer channel and at a distance to the transfer channel without the exhaust-gas values of the engine deteriorating. Advantageously, the recess is arranged in a region of the cylinder bore disposed on the side of the inlet with this region defining an angle of approximately 45° to approximately 70° with the center plane of the cylinder. As a practical matter, two recesses are arranged symmetrically to the center plane.

To ensure that the recess is separated from the outlet at each position of the piston, the lower edge of a recess, which faces toward the crankcase, is disposed at an elevation which is offset relative to the upper edge of the outlet facing toward the combustion chamber at least by the width of a piston ring. In this way, a direct connection of the recess to the outlet can be avoided.

Advantageously, at least one recess is so arranged in the cylinder bore that its upper edge, which faces toward the combustion chamber, is traveled over by the upper edge of the piston facing toward the combustion chamber at a crankshaft angle of approximately 90° ahead of top dead center up to approximately 55° ahead of top dead center. It is practical if at least one recess is so arranged in the cylinder bore that its lower edge, which faces away from the combustion chamber, is traveled over by the upper edge of the piston at a crankshaft angle of approximately 100° ahead of top dead center up to approximately 140° ahead of top dead center. The recess is then advantageously so designed that a delay-free starting is possible. The recess is so designed that the engine does not start when a delay occurs during the starting operation because of forces in the starter spring which are too low.

Several recesses having low flow cross sections are advantageously provided in order to, during operation, achieve little or no impairment because of the recess. The flow cross section of at least one, but especially each recess, is advantageously less than 5 $mm^2$ and especially less than 1 $mm^2$. A simple configuration results when at least one recess is configured as a groove in the cylinder bore running parallel to the cylinder longitudinal axis.

An independent concept of the invention relates to the reduction of the gas volume in the combustion chamber via the piston rings. To achieve targeted leakages between combustion chamber and crankcase via the piston rings, it is advantageously provided that the piston has only one piston ring. The piston ring gap of the piston ring is then advantageously arranged on the side of the piston which lies facing toward the inlet.

However, also two piston rings can be provided in order to reduce the gas volume in the combustion chamber via the piston rings with the piston ring gaps conjointly defining an angle up to approximately 45°. A targeted leakage is likewise given because of the comparatively small angle between the piston ring gaps. This targeted leakage is effective only during the starting operation and not during operation per se because of the rapid movement of the piston during operation.

The piston ring gaps of the two piston rings are advantageously arranged in the region of the inlet. Because of the lever relationships at the crankshaft, the piston comes to lie, during compression (that is, during the upward stroke of the piston), against the outlet side of the cylinder bore and during expansion (that is, the downward stroke of the piston), against the inlet side. With the arrangement of the two piston ring gaps approximately opposite on the cylinder (that is, one piston ring gap in the region of the outlet and the other piston ring gap in the region of the inlet), the piston always lies in the region of a piston ring gap against the cylinder bore. In that now both piston ring gaps are arranged in a small angular region and especially in the region of the inlet, it can be achieved that, with the upward stroke of the piston (that is, when the piston comes to lie against the cylinder bore in the region of the outlet), in the region of the piston ring gaps, a targeted leakage is provided between combustion chamber and crankcase. This leakage is effective only for the slow piston movements during the starting operation. In operation, this leakage is without influence because of the rapid operations.

The starter device includes a spring which, in the effective direction, is provided between the pull unit and a catch for connecting the starting device to the crankshaft of the engine. It is practical if the pull unit is a rope pulley to which rotation is imparted via a pull rope. However, the throw-on unit can also advantageously be an electrically operated throw-on unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
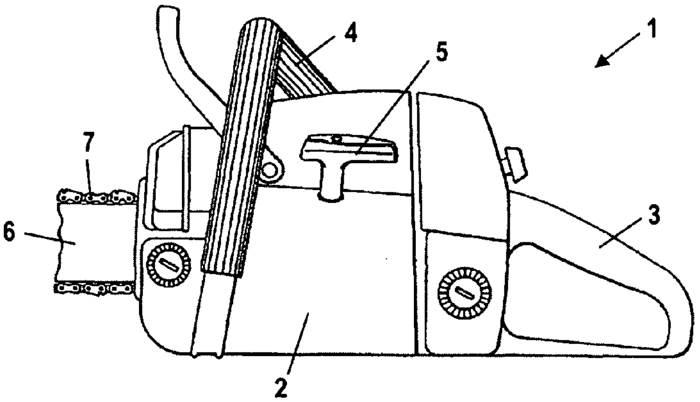
FIG. 1 is a side elevation view of a motor-driven chain saw.

FIG. 1 shows a motor-driven chain saw as an example for a portable handheld work apparatus. The invention can, however, be used advantageously in other handheld work apparatus such as cutoff machines, brushcutters or the like.

The motor-driven chain saw 1 has a housing 2 on which a rearward handle 3 is attached. A guide bar 6 projects forwardly from the housing 2 on the side lying opposite to the rearward handle 3. A saw chain 7 is driven around the periphery of the guide bar 6. On the end facing toward the guide bar 6, a handle tube 4 projects from the housing 2 and likewise functions to guide the motor-driven chain saw 1. A throw-on handle 5 of a starter device projects from the housing 2. The starter device is described in greater detail hereinafter.

Figure 2:
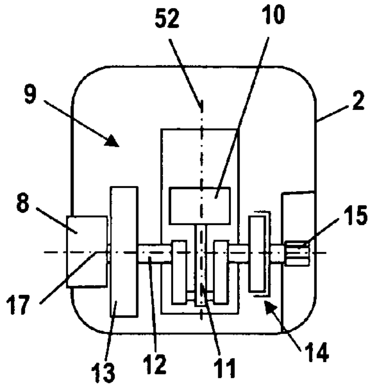
FIG. 2 is a schematic section view through the motor-driven chain saw of FIG. 1.

The internal combustion engine 9 shown in FIG. 2 is provided to drive the saw chain 7 about the guide bar 6. In the embodiment, the internal combustion engine 9 is configured as a two-stroke engine. The internal combustion engine 9 can, however, also be a four-stroke engine, especially, a mixture-lubricated four-stroke engine. The internal combustion engine 9 has a piston 10 which rotatingly drives a crankshaft 12 about a rotational axis 17 via a connecting rod 11. The crankshaft 12 is connected to a starter device 8. A fan wheel 13 is connected to the crankshaft 12 and is disposed between the starter device 8 and the internal combustion engine 9. A centrifugal clutch 14 is provided on the side of the engine 9 facing away from the fan wheel 13. The centrifugal clutch 14 is connected to a drive pinion 15 for the saw chain 7.

Figure 3:
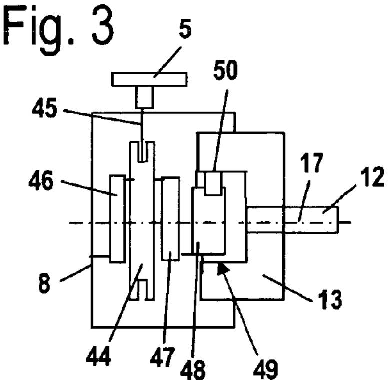
FIG. 3 is a schematic section view through the starter device of the motor-driven chain saw of FIG. 1.

In FIG. 3, the starter device 8 is shown enlarged. As a throw-on unit, the starter device 8 has a rope pulley 44 on which a pull rope 45 is wound and the pull rope 45 is connected to the throw-on handle 5 projecting from the housing 2. Rotation can be imparted by the operator to the rope pulley 44 via the throw-on handle 5. A return spring 46 is provided on the rope pulley 44 on the side facing away from the crankshaft 12. The return spring 46 rolls up the pull rope 45 after the engine is thrown on. The starter device 8 has a catch 49 for connecting to the crankshaft 12. The catch 49 is connected to the rope pulley 44 via a spring 47. The spring 47 is connected with one end thereof to the rope pulley 44 and is attached with its other end to an entrainment device 48. A pawl 50 of the catch 49 engages on the entrainment device 48. The pawl 50 is journalled on the fan wheel 13 held on the crankshaft 12 so as to rotate therewith.

Figure 4:
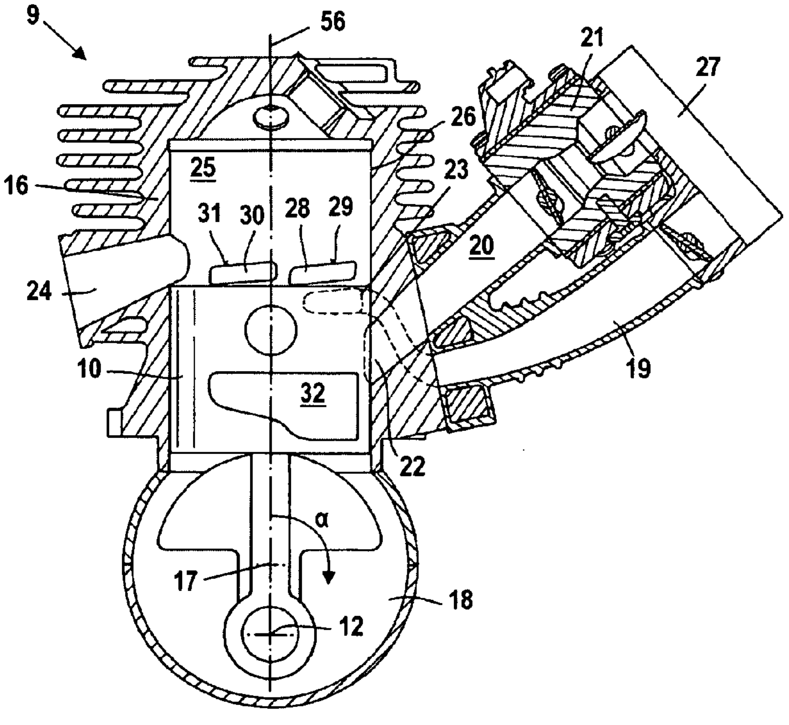
FIG. 4 is a schematic section view through the internal combustion engine of the motor-driven chain saw of FIG. 1.

FIG. 4 shows the configuration of the internal combustion engine 9. The engine 9 has a cylinder 16 which, in turn, has a cylinder bore 26. A combustion chamber 25 is formed in the cylinder bore 26 and is delimited by the piston 10. At bottom dead center of the piston 10 shown in FIG. 4, a crankcase 18 is connected to the combustion chamber 25 via a total of four transfer channels 28 and 30. The crankshaft 12 is journalled in the crankcase 18. Two sets of transfer channels 28 and 30 are arranged symmetrically to a center plane 52 which is shown schematically in FIG. 2 and which defines the cutting plane in FIG. 4. As shown in FIG. 4, the transfer channels 28 open with transfer windows 29 into the combustion chamber 25 and the transfer channels 30 open into the combustion chamber 25 with transfer windows 31.

An outlet 24 for exhaust gases leads out of the combustion chamber 25. The two transfer channels 30 are disposed so as to be outlet near. A mixture channel 20 having an inlet 22 opens on the side of the cylinder bore 26 lying opposite the outlet 24. The mixture channel 20 is connected via a carburetor 21 to an air filter 27. In the carburetor 21, fuel is supplied to the combustion air, which is drawn in via the air filter 27, so that an air/fuel mixture is supplied into the crankcase 18. It can, however, also be provided to supply substantially fuel-free combustion air via the inlet 22 and to separately meter the fuel.

The air filter 27 is furthermore connected to a feed channel 19 which opens at the cylinder bore 26 with two feed channel inlets 23 arranged symmetrically to the center plane 52. The feed channel inlets 23 are arranged in the region of the cylinder bore 26 and are closed by the piston 10 in each position thereof. The feed channel inlets 23 are arranged on the side of the inlet-near transfer windows 29 with this side facing toward the crankcase 18. To connect the feed channel inlets 23 to the transfer windows 29 and 31, piston pockets 32 are provided in the piston 10 on each side of the center plane 52. The piston pockets 32 establish a connection between the feed channel inlets 23 and the transfer windows 29 and 31 in the region of top dead center of the piston 10. The position of the piston 10 can be given via the crankshaft angle (α). The crankshaft angle (α) is 0° in the position of the piston 10 at bottom dead center shown in FIG. 4. At top dead center, the crankshaft angle (α) is 180°. The piston 10 moves in the cylinder bore 26 in the direction of a cylinder longitudinal axis 56. The cylinder longitudinal axis 56 is the longitudinal center axis of the cylinder bore 26.

Figure 5:
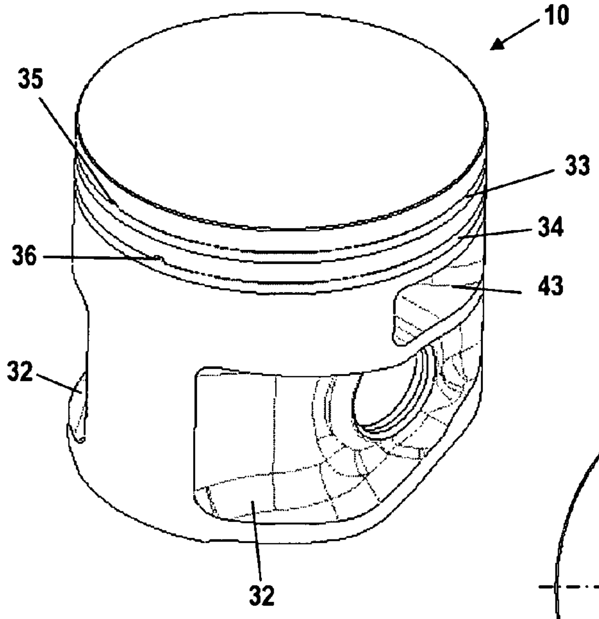
FIG. 5 is a perspective view of the piston of the internal combustion engine.
Figure 6:
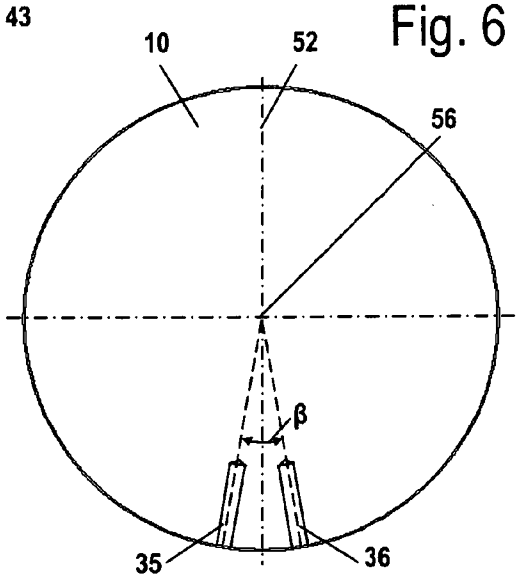
FIG. 6 is a plan view of the piston of FIG. 5.
Figure 7:
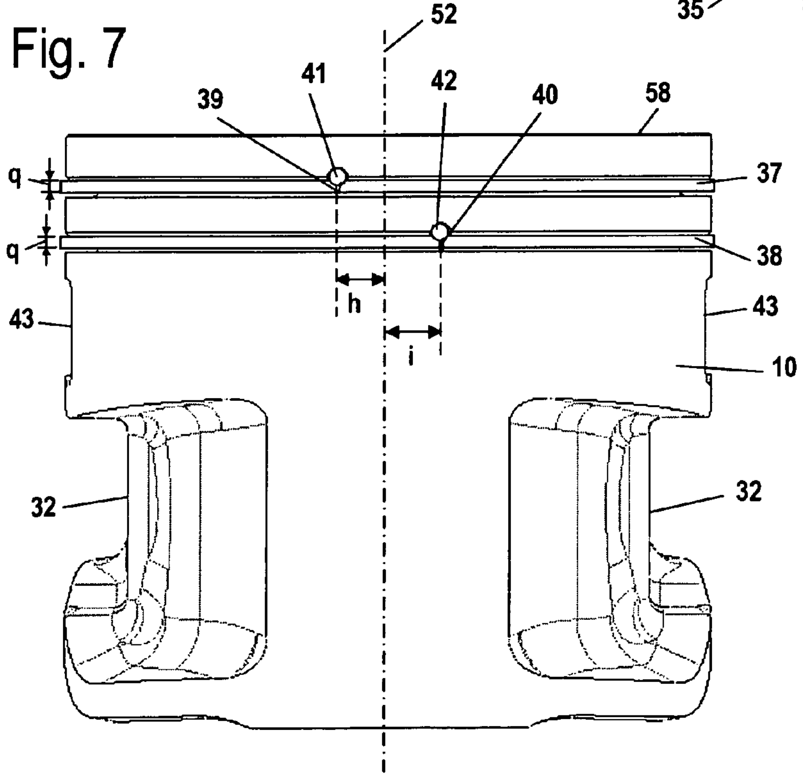
FIG. 7 is a schematic view of the piston of FIG. 5.

When starting the internal combustion engine 9, the gas pressure in the combustion chamber 25 must be overcome by the starter device 8. In order to reduce the gas volume in the combustion chamber 25 during the starting operation, the configuration of the piston 10 shown in FIGS. 5 to 7 is provided. As shown in FIG. 5, the piston 10 has respective cavities 43 above the piston pockets 32 which function to save weight. The piston 10 has a first piston ring groove 33 and a second piston ring groove 34. Each piston ring groove (33, 34) has a bore (35, 36) for accommodating holding pins (41, 42), which are shown in FIG. 7, for holding the piston rings 37 and 38 which are likewise shown in FIG. 7. The piston rings 37 and 38 are configured as open rings whose two ends lie adjacent to each other at a piston ring gap (39, 40) in a region of the holding pins 41 and 42. The distance of the two ends can advantageously be selected to be comparatively large in order to reduce the gas volume in the combustion chamber 25 during the starting operation. A piston ring gap (39, 40) of approximately 0.1 mm to approximately 2 mm has been shown to be advantageous. Both piston rings (37, 38) have a width (q) which is measured parallel to the cylinder longitudinal axis 56 (FIG. 4).

FIG. 6 shows the position of the bores 35 and 36 and therefore the position of the piston ring gaps (39, 40) referred to the center plane 52 of the engine 9. As shown in FIG. 6, the two bores 35 and 36 are arranged symmetrically to the center plane 52 on the side of the cylinder bore 26 facing toward the inlet 22. The two bores 35 and 36 lie radially to the cylinder longitudinal axis 56 and conjointly define an angle (β) which is advantageously less than 45°. The angle (β) is advantageously approximately 10° to approximately 30°. The piston ring gap 39 is at a distance (h) to the center plane 52 measured in the peripheral direction of the piston 10 and the piston ring gap 40 is arranged on the opposite-lying side of the center plane 52 and is at a distance (i) to the center plane 52 measured in the peripheral direction. The distances (h, i) are advantageously equal. A targeted leakage between the combustion chamber 25 and the crankcase 18 during starting of the engine 9 can be achieved because the two piston ring gaps 39 and 40 lie at a small distance to each other in the peripheral direction of the piston 10. During operation, this leakage is not effective because of the dynamic, rapid operations.

Figure 18:
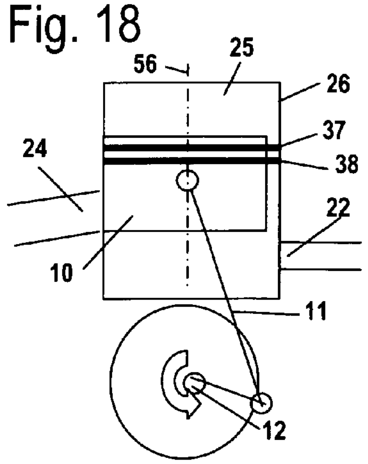
FIG. 18 is a schematic of an internal combustion engine with the piston shown during the upward stroke.

Because of the arrangement of the piston ring gaps 39 and 40 on the side of the cylinder bore 26 facing toward the inlet 22, a defined gap is given between the wall of the cylinder bore 26 and the piston 10 during the upward stroke of the piston through which gas from the combustion chamber 25 can pass into the crankcase 18. The gap arises because of the contact of the piston 10 against the side of the cylinder bore 26 facing toward the outlet 24. This is shown schematically in FIG. 18. As shown in FIG. 18, the piston comes to lie against the outlet-side wall of the cylinder bore 26 because of the force applied by the connecting rod 11 to the piston 10 perpendicularly to the cylinder longitudinal axis 56.

Figure 8:
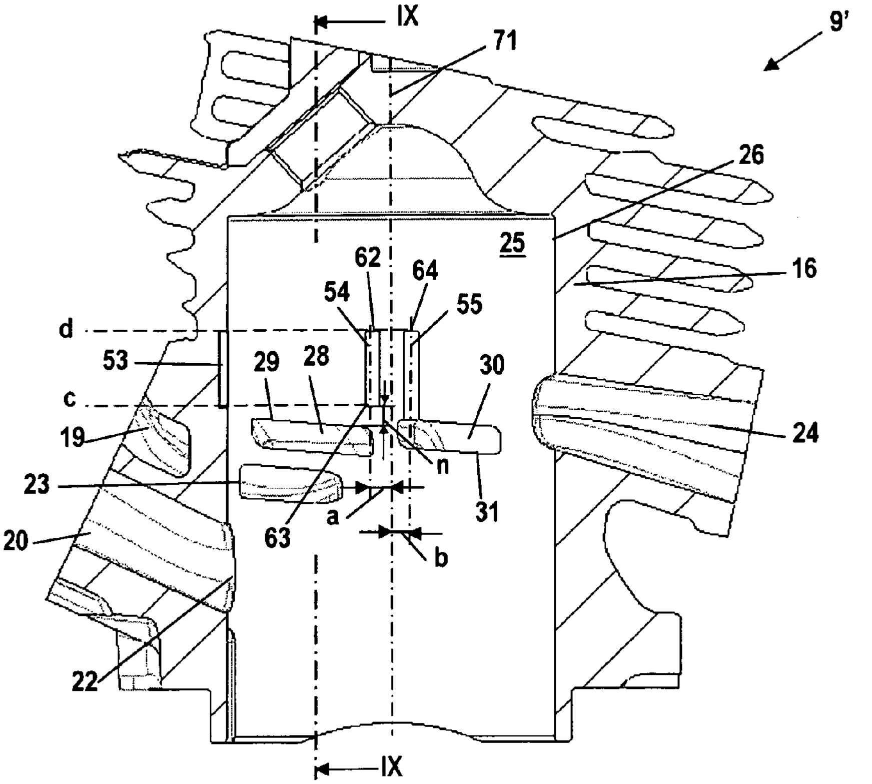
FIG. 8 is a section view through an embodiment of the cylinder of the internal combustion engine of the motor-driven chain saw.

An embodiment of an internal combustion engine 9' having a cylinder 16 is shown in FIG. 8. The engine 9' corresponds essentially to the engine 9 of FIG. 4. The same reference numerals identify elements corresponding to each other. As shown in FIG. 8, the cylinder bore 26 of the engine 9' has grooves 53, 54 and 55 which run parallel to the cylinder longitudinal axis 56 and which are configured as recesses in the cylinder bore 26. One groove 53 is arranged above, that is, on the side of the inlet 22 facing toward the combustion chamber 25. The groove 53 is therefore cut by the center plane 52 which is the cutting plane in FIG. 8. Two grooves 54 are arranged symmetrically to the center plane 52 above the inlet-near transfer channels 28. The grooves 54 are arranged above the region of the inlet-near transfer channels 28 which lie facing toward the outlet-near transfer channels 30. The engine 9' furthermore has two grooves 55 which are likewise arranged symmetrically to the center plane 52 and which are connected to the transfer windows 31 of the outlet-near transfer channels 30. The grooves 54 and 55 are arranged next to a transverse plane 71 of the cylinder 16 which perpendicularly cuts the center plane 52 and which contains the cylinder longitudinal axis 56. The grooves 54 are at a distance (a) to the transverse plane 71 and this distance can, for example, be approximately 1 mm to approximately 5 mm. The grooves 55 are arranged on the side of the transverse plane 71 facing toward the outlet and are at a distance (b) to the transverse plane 71 which likewise can be approximately 1 mm to approximately 5 mm.

Figure 9:
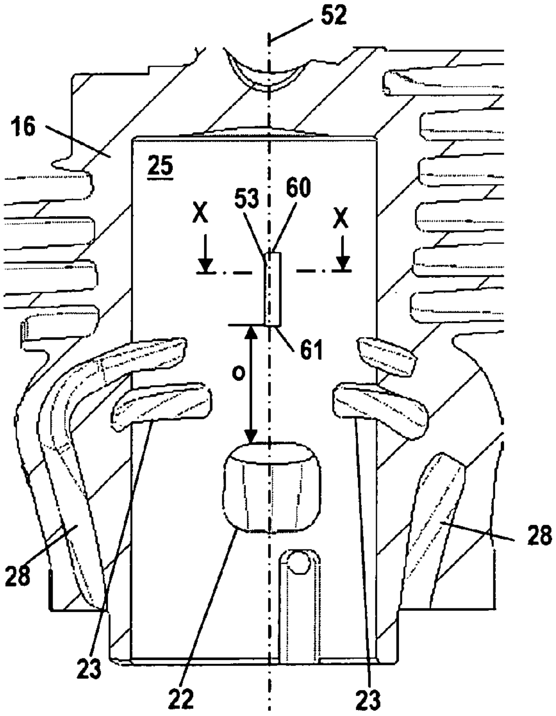
FIG. 9 is a section view taken along line IX-IX in FIG. 8.

As shown in FIG. 9, the groove 53 has an upper edge 60, which faces toward the combustion chamber 25, and a lower edge 61 which faces toward the crankcase 18. The lower edge 61 is at a distance (o) to the inlet 22 so that the groove 53 is not directly connected to the inlet 22.

As shown in FIG. 8, the lower edge 61 of the groove 53 is arranged at an elevation (c) and the upper edge 60 is at an elevation (d). The groove 54 has an upper edge 62, which faces toward the combustion chamber 25, and a lower edge 63 which faces toward the crankcase 18. The upper edge 62 of the groove 54 is likewise arranged at the elevation (d) and the lower edge 63 is likewise arranged at the elevation (c). An upper edge 64 of the groove 55, which faces toward the combustion chamber 25, is also arranged at the elevation (d). The elevation (c) is so arranged that it is traveled over by the upper edge 58 of the piston 10 shown in FIG. 7 at a crankshaft angle (α) of approximately 100° ahead of top dead center to approximately 140° ahead of top dead center. Accordingly, the grooves 53 and 54 are closed by the piston 10 starting at a crankshaft angle (α) of approximately 100° ahead of top dead center to approximately 140° ahead of top dead center. Advantageously, the elevation (c) lies at a crankshaft angle (α) of approximately 120° ahead of top dead center. The elevation (d) is so selected that the upper edges 60, 62 and 64 of the grooves 53, 54 and 55, which upper edges are arranged at the elevation (d), are traveled over by the upper edge 58 of the piston 10 at a crankshaft angle (α) of approximately 90° ahead of top dead center up to approximately 55° ahead of top dead center with the upper edge 58 facing toward the combustion chamber 25. At this crankshaft angle (α), the grooves 53, 54 and 55 are therefore closed. Advantageously, the elevation (d) is approximately 80° ahead of top dead center. As shown in FIG. 8, the lower edge 63 of the groove 54 has a distance (n) to the transfer window 29 measured in the direction of the cylinder longitudinal axis 56. The grooves 53 and 54 are closed to all function openings of the engine 9' which open at the cylinder bore 26. Only the groove 55 is connected to the transfer window 31.

Figure 10:
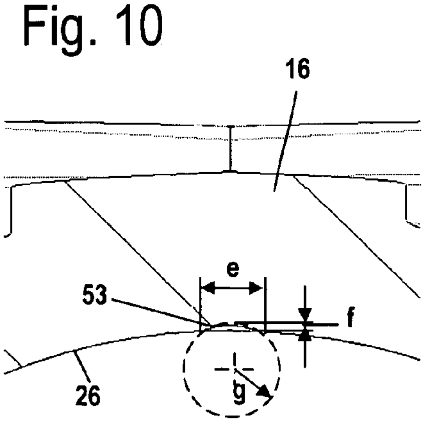
FIG. 10 is a section view taken along line X-X of FIG. 9.

FIG. 10 shows the configuration of the groove 53 in cross section. The grooves 54 and 55 have corresponding cross sections. The groove 53 is configured as a circular arc-shaped recess in the cylinder bore 26. The groove 53 has a width (e) which can, for example, be approximately 1.5 mm to approximately 10 mm. The groove 53 has a depth (f) which can be from approximately 0.1 mm to approximately 1 mm. Advantageously, the groove 53 is configured to have a circular arc shape. The circle forming the groove 53 has a radius (g) of advantageously approximately 3 mm to approximately 20 mm. With the arrangement of five grooves 53, 54 and 55, it is provided that the width (e) is, for example, approximately 2 mm, the depth (f) approximately 0.2 mm and the radius (g) approximately 5 mm. Because the groove 55 has only a very small flow cross section, no deterioration of power or exhaust-gas values results during operation. Because of the low flow cross section, the groove 55 has no influence during operation on the internal combustion engine 9'. A width (e) of approximately 7.5 mm, a depth (f) of approximately 0.7 mm and a radius (g) of approximately 14 mm are provided for a cylinder 16, which has overall one or two grooves, like the cylinder shown in FIGS. 15 and 16 which will be described in still greater detail hereinafter.

FIGS. 11 to 14 show an embodiment of the internal combustion engine 9' with the piston 10 in different positions. In the embodiment of the engine 9' shown in FIGS. 11 to 14, a total of only four grooves 54 and 55 are provided. A groove 53 above the inlet 22 is not provided.

Figure 11:
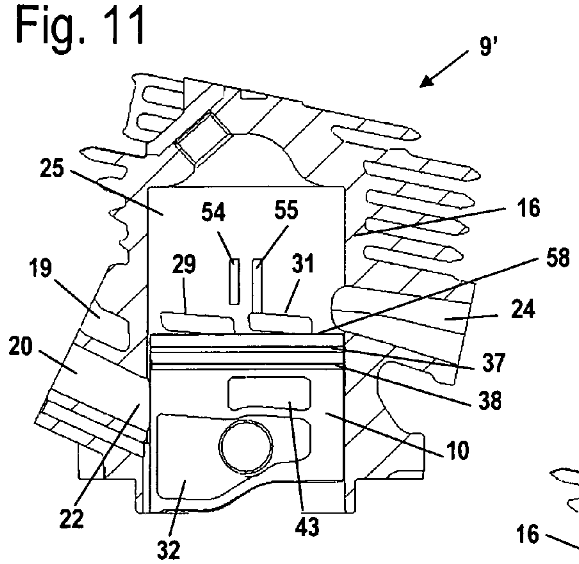
FIGS. 11 to 14 are section views of the internal combustion engine of FIG. 8 with the piston shown in respectively different positions.
Figure 12:
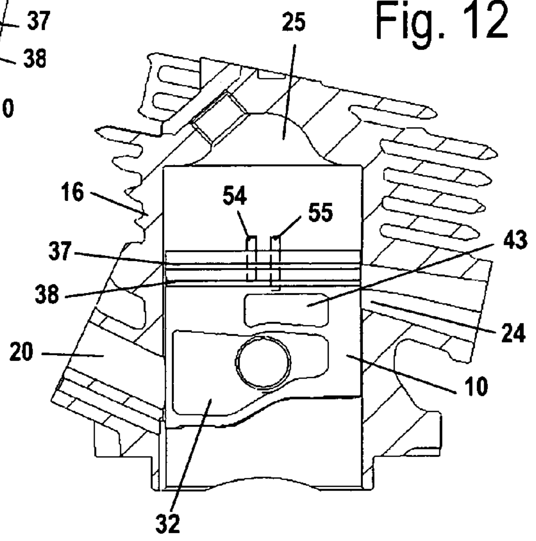
Figure 13:
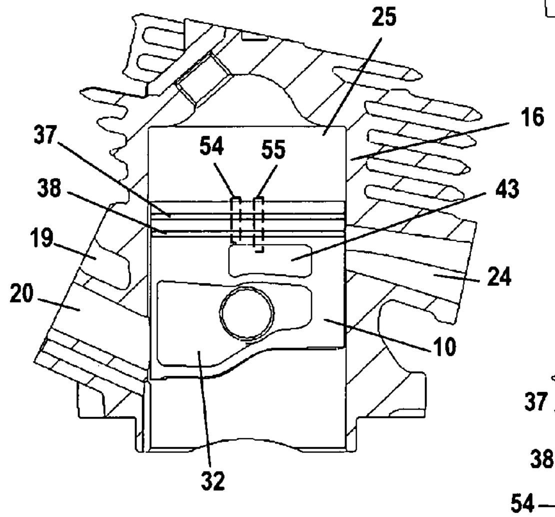
Figure 14:
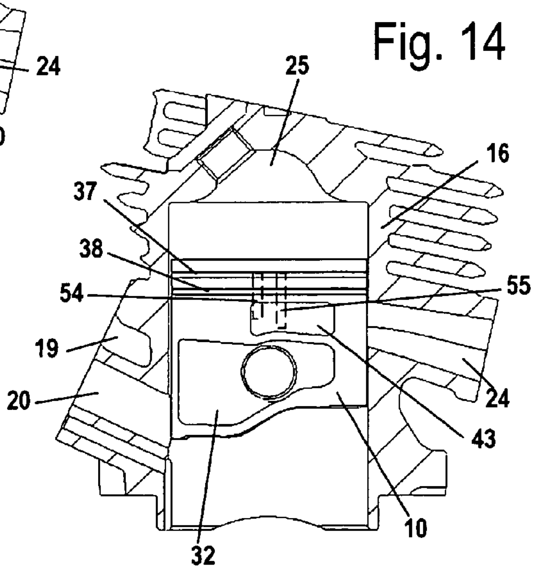

FIG. 11 shows the piston 10 at bottom dead center. The transfer openings 31 and 29 are completely open in this position of the piston. In FIG. 12, the piston 10 is shown after closing the outlet 24. In this position of the piston 10, the groove 55 establishes a connection between the combustion chamber 25 and the transfer window 31. The lower edge of the groove 54 is still closed by the second piston ring 38. In the position of the piston 10 shown in FIG. 13, both grooves 54 and 55 establish a connection between the combustion chamber 25 and the crankcase 18 since both grooves 54 and 55 bridge the two piston rings 37 and 38. In the position of the piston 10 shown in FIG. 14, the grooves 54 and 55 are closed by the piston 10. The first piston ring 37 is arranged in the region of the upper edge of the grooves 54 and 55. In this position of the piston 10, no further compression reduction takes place.

Because of the position of the grooves 54 and 55, the position of the piston 10 can be adjusted when starting the engine and therefore the compression, which is still to be overcome, for starting the engine. In starter devices which store the energy, which is introduced by the pull rope, over several strokes of the pull rope in a starter spring, the position of the grooves 54 and 55 fixes the position of the piston 10 for a starter spring which is not completely relaxed.

Figure 15:
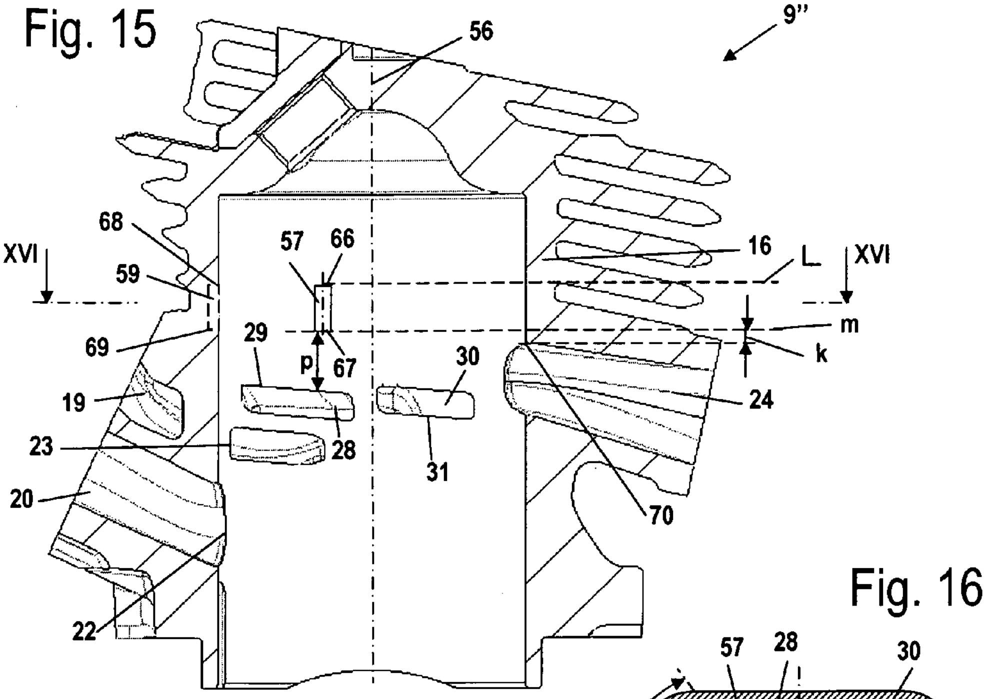
FIG. 15 is an embodiment of a cylinder of an internal combustion engine.
Figure 16:
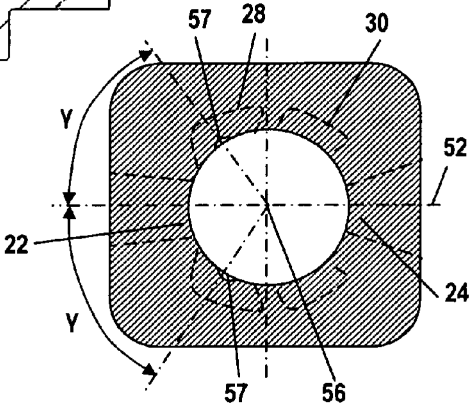
FIG. 16 is a schematic section view taken along line XVI-XVI of FIG. 15.

FIGS. 15 and 16 show a further embodiment of an internal combustion engine 9". The same reference numerals identify here the same elements. The cylinder 16 of the engine 9" has two grooves 57 which are arranged symmetrically to the center plane 52. The center plane 52 defines also the cutting plane in FIG. 15. The grooves 57 have an upper edge 66, which faces toward the combustion chamber 25, and a lower edge 67 which faces the crankcase 18. The upper edge 66 is arranged at an elevation (L) and the lower edge 67 is at an elevation (m). The upper edge 66 is so arranged that it is traveled over by the upper edge 58 of the piston 10 at a crankshaft angle of approximately 90° ahead of top dead center to approximately 55° ahead of top dead center. The upper edge 58 faces toward the combustion chamber. The lower edge 67 is so arranged that it is passed over by the upper edge 58 of the piston 10 at a crankshaft angle (α) of approximately 100° ahead of top dead center up to approximately 140° ahead of top dead center. The lower edge 67 of the groove 57 is arranged at an elevation of the cylinder bore 26 which has a distance (k) to the upper edge 70 of the outlet 24 measured in the direction of the cylinder longitudinal axis 56 with the upper edge 70 facing toward the combustion chamber 25. The distance (k) corresponds advantageously to at least the width (q) of a piston ring (37, 38) shown in FIG. 7. As shown in FIG. 15, the lower edge 67 has a distance (p) to the transfer window 29 of the inlet-near transfer channel 28. Each groove 57 is arranged above an inlet-near transfer window 29.

Alternatively or in addition to the grooves 57, a groove 59 can be provided which is arranged above inlet 22 and has an upper edge 68 and a lower edge 69. The upper edge 68 is advantageously arranged at an elevation (L) and the lower edge 69 is arranged at an elevation (m).

FIG. 16 shows the arrangement of the two grooves 57. As shown in FIG. 16, the two grooves 57 are arranged at an angle (γ) to the center plane 52 which advantageously is approximately 50° to approximately 75°. An angle (γ) of approximately 55° to approximately 60° has been shown to be especially advantageous.

Advantageously, all grooves 53, 54, 55, 57 and 59 have a flow cross section which is less than 5 $mm^2$. The flow cross section of the grooves 53, 54, 55, 57 and 59 is less than 1 $mm^2$.

Figure 17:
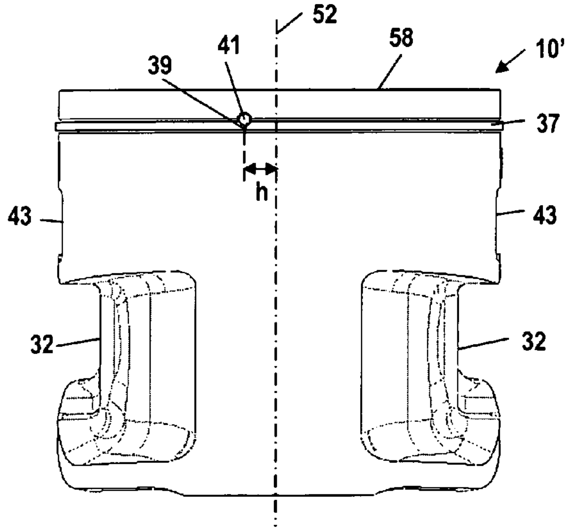
FIG. 17 is a side elevation of an embodiment of a piston.

In FIG. 17, a further embodiment for a piston 10' is shown. The same reference numerals identify here the same elements. The piston 10' has only one piston ring 37 having a piston ring gap 39 which is arranged above the inlet 22. The piston ring gap 39 is arranged at a distance (h) to the center plane 52. The distance (h) is measured at the periphery of the piston 10' and advantageously corresponds to the arrangement of the holding pin 41 in the half angle (β), see FIG. 6, to the center plane 52.

The embodiments shown for the configurations of the pistons (10, 10') and for the configuration of the internal combustion engine (9, 9', 9") can be combined with each other.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:

an internal combustion engine;

a starter device operatively connected to said internal combustion engine;

said internal combustion engine including:

a cylinder defining a combustion chamber and a cylinder longitudinal axis;

a crankcase connected to said cylinder;

a crankshaft rotatably journalled in said crankcase;

a piston disposed in said cylinder so as to move back and forth therein to drive said crankshaft and to delimit said combustion chamber;

at least one transfer channel for connecting said crankcase to said combustion chamber at constructively pregiven positions of said piston;

said transfer channel having at least one transfer window opening into said combustion chamber;

an inlet for receiving combustion air into said crankcase;

a device for metering fuel;

an outlet for passing exhaust gases from said combustion chamber;

said transfer window, said inlet and said outlet all being function openings of said internal combustion engine;

said cylinder having an imaginary center plane which partitions said inlet at the middle thereof and contains said cylinder longitudinal axis;

said piston having a piston ring arranged therein;

said piston ring being configured as an open ring having two mutually adjacent ends conjointly defining a piston ring gap;

said cylinder having an inner wall surface defining a cylinder bore for accommodating said piston;

said function openings being disposed in said inner wall surface defining said cylinder bore;

said cylinder bore further having a recess formed in said inner wall surface which bridges said piston ring in at least one position of said piston so as to establish a connection between said combustion chamber and said crankcase;

said recess being at a predetermined spacing to all of said function openings in said wall surface defining said cylinder bore so as to preclude a direct connection between said recess and said function openings; and, said cylinder bore having a plurality of said recesses formed therein and each of said recesses having a flow cross section of less than 5 $mm^2$.

2. The handheld work apparatus of claim 1, wherein said recess is arranged above said inlet.

3. The handheld work apparatus of claim 1, wherein said recess is arranged above said transfer channel.

4. The handheld work apparatus of claim 3, wherein said recess is arranged in a region of said cylinder bore disposed on the side of said inlet with said region and said center plane conjointly defining an angle (γ) in a range from approximately 45° to approximately 70°.

5. The handheld work apparatus of claim 1, wherein said recess is a first recess and wherein said cylinder bore has a second recess and said first and second recesses are symmetrical with respect to said center plane.

6. The handheld work apparatus of claim 1, wherein said piston ring has a width (q) and said recess has a lower edge facing toward said crankcase; said outlet has an upper edge facing toward said combustion chamber; and, said lower edge of said recess is at an elevation (m) offset from said upper edge of said outlet by at least said width (q) of said piston ring.

7. The handheld work apparatus of claim 1, wherein said recess has an upper edge facing toward said combustion chamber and said piston has an upper edge facing toward said combustion chamber; said recess is arranged in said cylinder bore so as to cause said upper edge of said piston to pass over said upper edge of said recess in a crankshaft angle (α) range of approximately 90° ahead of top dead center to approximately 45° ahead of top dead center.

8. The handheld work apparatus of claim 1, wherein said recess has a lower edge facing away from said combustion chamber and said piston has an upper edge; and, said recess is arranged in said cylinder bore so as to cause said upper edge of said piston to pass over said lower edge of said recess in a crankshaft angle (α) range of approximately 100° ahead of top dead center up to approximately 140° ahead of top dead center.

9. The handheld work apparatus of claim 1, wherein said recess is configured as a groove running parallel to said cylinder longitudinal axis.

10. The handheld work apparatus of claim 1, wherein said starter device comprises a catch for connecting to said crankshaft; a throw-on unit movable in a work direction; and, a spring provided in said work direction between said throw-on unit and said catch for connecting said starter unit to said crankshaft.

11. The handheld work apparatus of claim 10, wherein said throw-on unit is a rope pulley to which rotation is imparted via a throw-on rope.

12. The handheld work apparatus of claim 1, wherein said recess is an elongated recess extending in the direction of said cylinder longitudinal axis.

13. A handheld work apparatus comprising:

an internal combustion engine;

a starter device operatively connected to said internal combustion engine;

said internal combustion engine including:

a cylinder defining a combustion chamber and a cylinder longitudinal axis;

a crankcase connected to said cylinder;

a crankshaft rotatably journalled in said crankcase;

a piston disposed in said cylinder to delimit said combustion chamber and so as to move through upward and downward strokes therein;

at least one transfer channel for connecting said crankcase to said combustion chamber at constructively pregiven positions of said piston;

an inlet for receiving combustion air into said crankcase;

a device for metering fuel to mix with said combustion air;

an outlet for passing exhaust gases from said combustion chamber;

said cylinder having a cylinder bore;

said cylinder bore having a first side facing toward said inlet and a second side facing toward said outlet;

said cylinder having an imaginary center plane which partitions said inlet at the middle thereof and contains said cylinder longitudinal axis;

said piston having first and second piston rings arranged therein;

said piston rings each being configured as an open ring having two mutually adjacent ends conjointly defining a piston ring gap;

the respective piston ring gaps of said first and second piston rings conjointly defining an angle (β) of less than approximately 45° measured in plan view of said piston about said cylinder longitudinal axis;

said first and second piston rings being arranged in said piston so as to position said piston ring gaps at said first side of said cylinder bore;

a connecting rod connecting said piston to said crankshaft to drive said crankshaft in rotation in response to said upward and downward strokes with said connecting rod imparting a force to said piston during said upward stroke thereof; and, said force imparted to said piston during said upward stroke and said piston ring gaps disposed at said first side of said cylinder bore coacting to cause targeted leakage gaps to occur between said combustion chamber and said crankcase permitting gases to flow from said combustion chamber into said crankcase during said upward stroke when conducting a start operation with said start device.

14. The handheld work apparatus of claim 13, further comprising holding pins for holding corresponding ones of said piston rings in position.

15. The handheld work apparatus of claim 13, wherein said force imparted to said piston via said connecting rod during said upward stroke acts upon said piston in a direction perpendicular to said longitudinal axis so as to cause said piston to lie against said first side of said cylinder bore.

* * * * *